United States Patent
Crum et al.

[11] Patent Number: 5,827,377
[45] Date of Patent: Oct. 27, 1998

[54] FLEXIBLE ALLOY AND COMPONENTS MADE THEREFROM

[75] Inventors: James Roy Crum, Ona; Gaylord Darrell Smith, Huntington; Vernon William Hartmann, Huntington; William Lawrence Mankins, Huntington, all of W. Va.

[73] Assignee: INCO Alloys International, Inc., Huntington, W. Va.

[21] Appl. No.: 757,405

[22] Filed: Oct. 31, 1996

[51] Int. Cl.$^6$ .................................................. C22C 30/00
[52] U.S. Cl. ...................... 148/442; 148/419; 420/584.1; 420/586
[58] Field of Search ................... 148/419, 442; 420/584.1, 586.1

[56] References Cited

U.S. PATENT DOCUMENTS

| | | |
|---|---|---|
| 3,160,500 | 12/1964 | Eiselstein et al. . |
| 4,421,571 | 12/1983 | Kudo et al. ............................. 148/442 |
| 4,489,040 | 12/1984 | Asphahani et al. .................. 420/586.1 |
| 4,761,190 | 8/1988 | Smith . |
| 4,765,956 | 8/1988 | Smith et al. ............................ 420/445 |
| 4,784,831 | 11/1988 | Mankins et al. ........................ 420/584 |
| 5,372,662 | 12/1994 | Ganesan et al. ....................... 148/442 |
| 5,567,383 | 10/1996 | Noda et al. ............................. 420/586 |

FOREIGN PATENT DOCUMENTS 60-077918  5/1985  Japan ..................... 148/419

OTHER PUBLICATIONS

INCO Alloys News, 1996 No. 1—"Or, How Inconel Alloy 625LCF is Growing in Importance in Automobile Engineering", pp. 4–5.
E. Reinschmidt, "Corrosion Mechanisms in Metallic Bellows" CME Jun. 1987, pp. 40–42.
C. Hoffmann and A.J. McEvily, "The Effect of High Temperature Low Cycle Fatigue on the Corrosion Resistance of Austenitic Stainless Steels", Metallurgical Transactions A, vol. 13A, May 1982, pp. 923–927 (ASM and AIME).
W.T. McFarlan, "Corrosion and Processing Problems on Stainless Steel Bellows", Sampe Journal, Aug./Sep. 1974, pp. 4–8.
H.T. Michels, "Corrosion Performance of Heat Resisting Alloys in Automobile Exhausts," Metals Engineering Quarterly, Aug. 1974 vol. 14, No. 3, pp. 23–35.
American Boa Inc., Automotive Division, "Material Specification Spec. No.: ABI 2000/01", Nov. 1997, pp. 2–2.

Primary Examiner—Margery Phipps
Attorney, Agent, or Firm—Edward A. Steen

[57] ABSTRACT

A nickel-base alloy having characteristics midway between selected stainless steels and INCONEL® alloy 625LCF®. Flexible and particularly useful for exhaust system bellows, wires and braids, the alloy includes about 24–42% nickel, about 18–28% chromium, 1.5–6% molybdenum, 0.2–1 % titanium, up to 1% aluminum, the balance iron, and up to about 1.4% silicon. The alloy demonstrates a novel characteristic of becoming stronger and more ductile during contemplated service temperatures of about 800°–1400° F. (427° C.–760° C.).

4 Claims, 5 Drawing Sheets

5,827,377

FLEXIBLE ALLOY AND COMPONENTS MADE THEREFROM

TECHNICAL FIELD

The instant alloy relates to nickel-base alloys in general and, more particularly, to a corrosion resistant alloy especially useful for flexible applications.

BACKGROUND ART

Operating requirements for automotive flexible exhaust couplings are readily becoming increasingly severe. Higher temperatures, tighter emission requirements along with extended warranties and governmental demands for increased gas mileage are rendering nominally selected coupling alloys marginally acceptable or, more often, unacceptable for a growing number of engine platforms. Requirements for longer life are demanding improvements in fatigue and corrosion resistant properties over those of currently employed alloys.

Typically, a bellows assembly is inserted between the exhaust manifold and the exhaust pipe. Due to the exacting requirement of modem catalytic exhaust systems, the bellows must allow for the flexible routing of exhaust system components while simultaneously preventing oxygen ingress to the oxygen sensor.

Current bellows are comprised of a welded two or three ply metal tubular sheet partially corrugated to form a flexible bellows arrangement. Two ply designs utilize stainless steel layers.

In a three ply arrangement, the outer ply is usually made from Inconel® alloy 625LCF® and the middle and inner plys are made from stainless steel (321 or 316Ti). (Inconel and 625LCF are trademarks of the Inco group of companies). The thickness of the plys range from about 0.005 inches (0.127 mm) to about 0.01 inches (0.254 mm).

The bellows in turn are protected by an inner and outer mesh covering of stainless steel (304) wire braid.

Experience has shown that the stainless steel bellows corrode due to the hot salt corrosion and chloride stress corrosion cracking. The road salt applied for deicing purposes eventually degrades the bellows. The requisite flexible nature of the bellows ultimately leads to the corrosive demise of the stainless steel. For this reason, manufacturers have been specifying Inconel alloy 625LCF as the protective outer ply since it resists salt originating corrosion in most of its manifestations.

Due to the competitive nature of the automotive industry there is a demand for a flexible alloy that is superior to stainless steels and lower in cost than Inconel alloy 625LCF.

SUMMARY OF THE INVENTION

Accordingly, there is provided an alloy particularly adapted for flexible bellows construction. Its fatigue resistance, hot salt corrosion resistance, chloride stress corrosive cracking resistance, pitting, and general corrosion resistance are superior to 321 and 316Ti stainless steels.

The alloy is weldable and has a work hardening rate similar to the stainless steels. With respect to thermal stability, there is no apparent loss in ductility after extended exposures to temperatures up to 1200° F. (649° C.).

PREFERRED MODE FOR CARRYING OUT THE INVENTION

Figure 1:
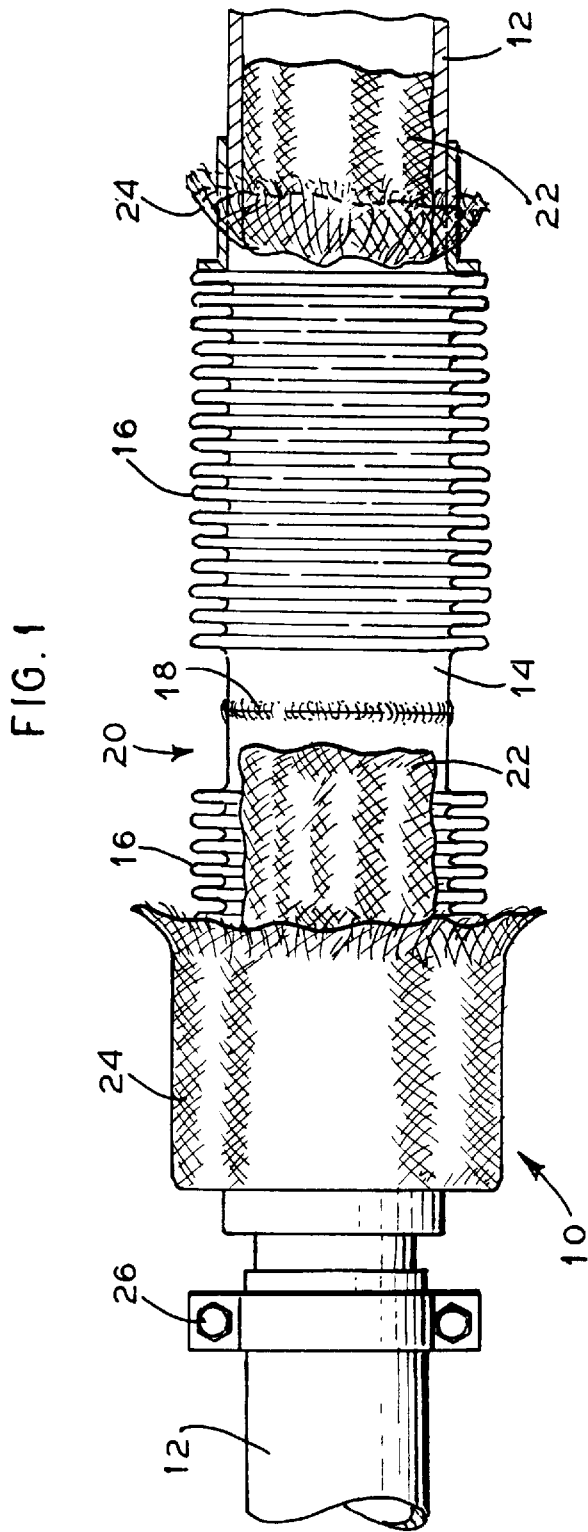
FIG. 1 is a plain view, partially cut away, of an exhaust bellows.

FIG. 1 depicts an automotive exhaust system bellows 10. The bellows 10 is situated on the exhaust line 12 between the exhaust manifold of an engine (not shown) and the muffler (not shown). The bellows 10 is designed to enable the exhaust pipe to be easily routed away from the engine while preventing the entry of oxygen into the catalytic converter. A conventional connector 26 is shown.

Typical bellows 10 are constructed from a tubular welded multiply sandwich (generally two or three layers) 14 of stainless steel and/or Inconel alloy 625LCF. When used, the 625LCF alloy forms the outer third layer. Each ply is about 0.01 inch (0.25 mm) thick. A portion of the alloy tube 14 is formed into flexible bellows section 16. Two bellows sections 16 are welded together at intersection 18 to form the bellows body 20.

An internal mesh 22 made from stainless steel wire braid (0.015 inch [0.38 mm] diameter.) is longitudinally disposed along the interior of the body 20 to protect the interior of the bellows 10 from the corrosive effects of exhaust gas. In FIG. 1, right side, a portion of the mesh 22 is pulled away and pushed back into the exhaust line 12 to display the internal body 20.

Similarly, an external mesh 24 is longitudinally disposed about the exterior of the bellow body 20 to protect the bellows 10 from the corrosive effects of road salt. The mesh 24 is displayed partially cut and pulled away.

Studies have shown that the position of the bellows 10 vis-a-vis the engine is critical with respect to corrosion. A bellows 10 located close to the engine runs hotter than a bellows 10 installed further downstream. The temperature gradients appear to affect intergranular sensitization. A relatively hotter unit made from 321 stainless experienced a corrosive attack rate of 140 mils per year in a standard intergranular sensitization test. A relatively cooler unit situated further downstream from the engine and made from 321 stainless demonstrated a corrosion rate less than 24 mils per year.

In general usage, sections of the outer stainless steel braid 24 and the outer most stainless steel ply exhibit varying degrees of corrosive attack. Apparently, the chlorides and sulfur found in road salt and exhaust gas respectively act in concert to cause transgranular stress corrosion cracking and corrosion fatigue cracking.

As with the placement of the bellows 10, the internal mesh 22 runs hotter due to intimate contact with the exhaust gas and experiences intergranular corrosion. The relatively cooler external mesh 24 experiences pitting and stress corrosion cracking.

The use of alloy 625LCF as a ply successfully alleviates corrosion problems. But engine manufacturers are seeking lower cost alternatives to multiply flexible stainless/alloy 625LCF combinations. Accordingly, the instant alloy which for the most part has intermediate properties between stainless steel and alloy 625LCF is an attractive alternative.

For bellows 10 construction one or two plies of the instant alloy may be cold worked into a tubular bellows shape, braided with the instant alloy and conveniently installed anywhere along the exhaust stream.

A preferred alloy composition includes about (in weight percent) 35.5–42% nickel, 21–28% chromium, 4.6–6% molybdenum, 0.8–1.5% silicon, 0.3–1% titanium, up to 0.25% copper, up to 0.45% niobium, up to 0.3% carbon, up to 0.5% manganese, up to 1% aluminum, up to 0.3 nitrogen, up to 0.001 sulfur, trace commercial impurities, and the balance iron.

A preferred alloy composition includes about 24–42% nickel, about 18–24% chromium, about 1.5–4.8% molybdenum, up to about 0.12% carbon, up to about 2% manganese, up to about 1% aluminum, about 0.2–1% titanium, trace commercial impurities, balance iron, and the improvement consisting of at least up to about 0.41% niobium, up to about 0.21% copper, and about 1–1.5% silicon.

A useful alloy composition includes about 30–35% nickel, about 21.1–21.2% chromium, about 0.08–0.13% aluminum, about 0.36–0.37% titanium, about 4.6–4.7% molybdenum, about 0.38% niobium, about 0.21–0.22% copper, about 0.8–1.42% silicon, trace commercial impurities and balance iron.

Fifty pound (22.7 kg) air melted laboratory heats of the instant invention were hot rolled at 2150° F. (1177° C.) to 0.250 inch (0.635 cm) plate, surface ground, annealed at 1950° F. (1066° C.) cold rolled to 0.110 inch (0.28 cm), strip and annealed at 1900° F. (1038° C.)/3 min, and then air cooled. Test compositions are shown in Table 1.

Duplicate unwelded hot salt specimens were cut to 0.75"× 3.0" (34 cm$^2$) and exposed with a 120 grit sanded surface.

Initial weight and thickness were recorded. The above heats were tested in hot salt test Series 18 at 1400° F. (760° C.) with daily immersion in 7.5% NaCl+2.5% CaCl$_2$ solution and the standard 15-5 (15 minutes in the furnace and 5 minutes out) cyclic exposure.

Specimens were removed from the test and weighed at 346, 750, 1197 and 1401 cycles. At the end of the test (1401 cycles) a 0.5 inch (1.27 cm) section was cut from the bottom of each specimen and mounted for determination of attack depth and total oxide thickness. Depth of attack is defined as the original specimen thickness minus the remaining thickness of unaffected metal after test divided by 2. Measurements were taken on both the left and right sides of duplicate specimens.

The total oxide thickness is defined as the combined thickness of surface oxide plus any internal oxidation present. The post test thickness of unaffected metal and total oxide thickness were determined by use of a measuring reticule in a light microscope at 100×.

Silicon levels from 0.11 to 1.42% in a 35% Ni—21% Cr—4.5% Mo balance Fe base composition were evaluated.

Figure 2:
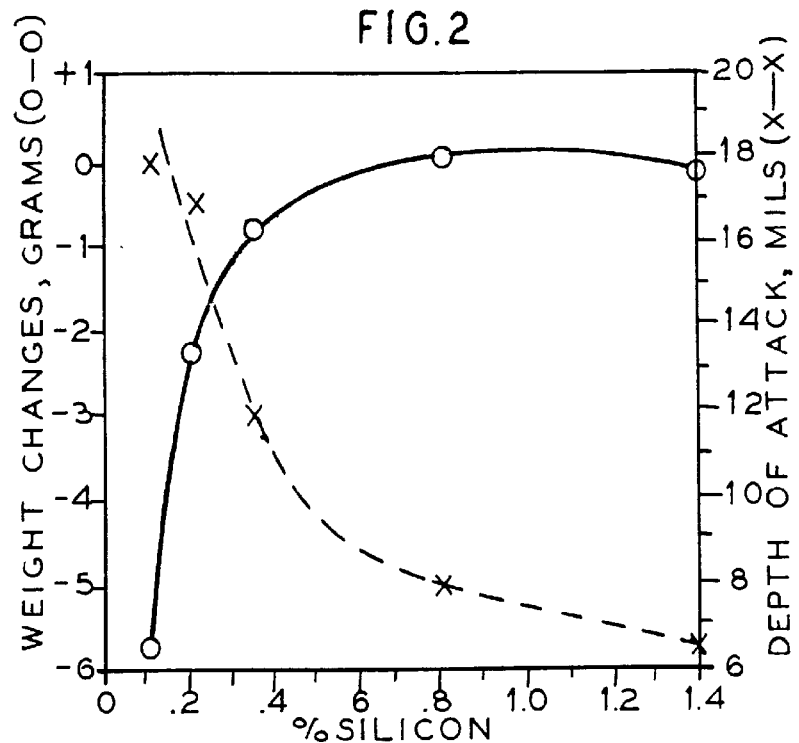
FIG. 2 is a graph of hot salt test results comparing weight change, silicon levels and attack depth.

Weight change and depth of attack measurements are given in Table 2. The final weight loss and depth of hot salt attack measurements after 1401 cycles are plotted in FIG. 2. Increasing silicon simultaneously reduces depth of attack and weight loss. Depth of attack is reduced about 63% and weight loss goes from almost 6 grams to a slight weight gain at 0.80% silicon. Depth of attack continues to decrease with increasing silicon up to about 1.42% though a substantial reduction in attack is achieved with 0.80% Si.

Figure 3:
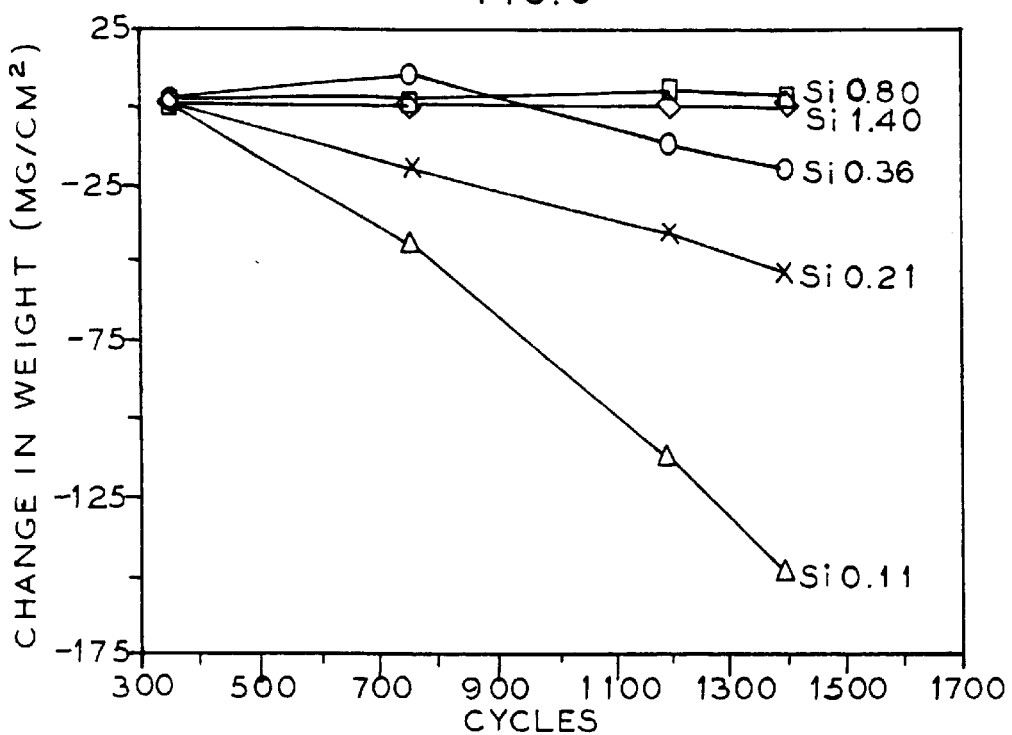
FIG. 3 is a graph plotting weight change v. cycles.
Figure 4:
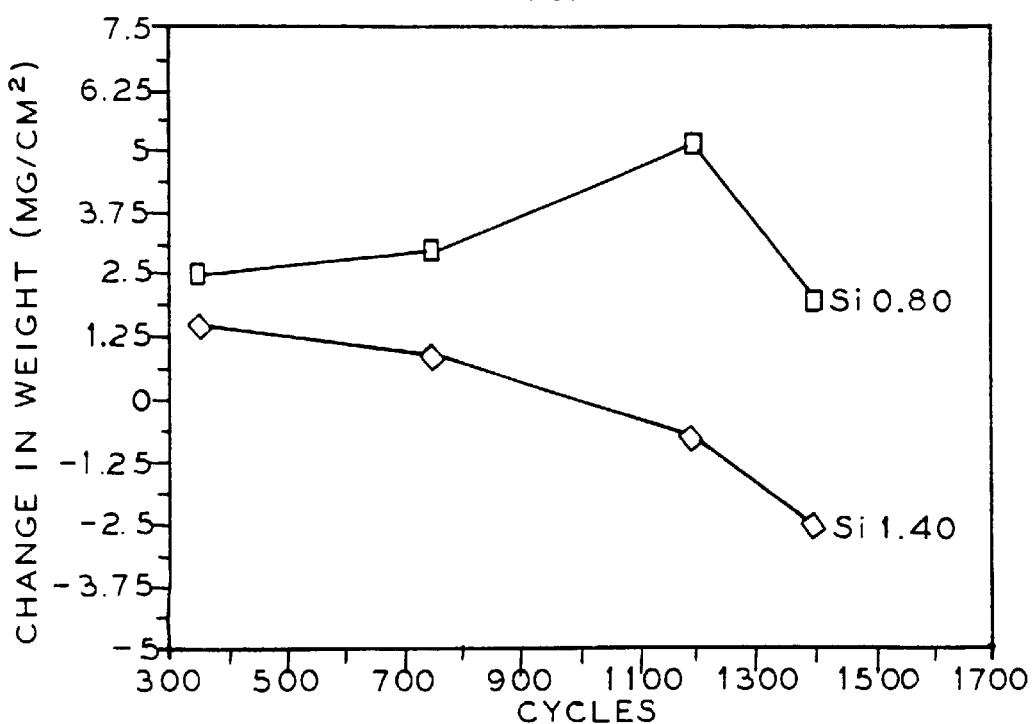
FIG. 4 is a graph plotting weight change v. cycles.

The consistent effect of silicon in reducing weight change with time during the 1401 hot salt cycle test is shown in Table 2 and FIG. 3. Data for the higher silicon heats are plotted on an expanded scale in FIG. 4. Both the 0.80% and 1.42% heats gain weight initially while the 1.42% silicon heat loses weight toward the end of the test. It is useful to consider a silicon range of about 1.1–1.5% silicon.

Figure 5:
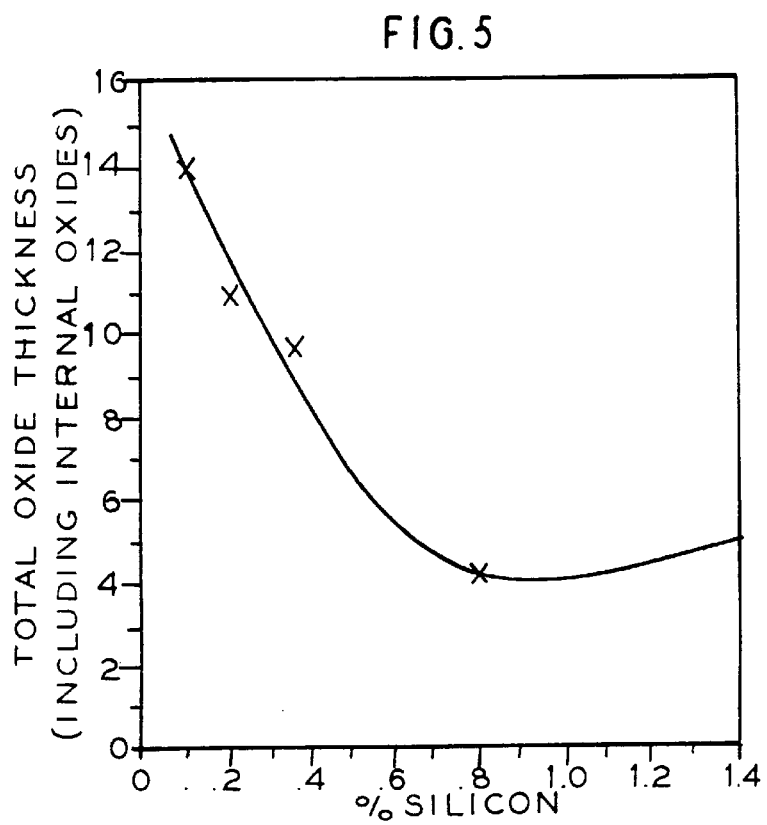
FIG. 5 is a graph of hot salt test results comparing oxide thickness and silicon levels.

Total oxide thickness measurements are given in Table 3 and average measurements are plotted in FIG. 5. These results mirror the weight change curve in FIG. 2. A thinner oxide corresponds with less weight loss.

The attack is not primarily intergranular, as previously noted in stainless steels. Results in FIGS. 2, 3, 4 and 5 demonstrate that silicon plays a key roll in slowing the rate of internal oxidation and in the development of an adherent oxide scale resistant to spalling.

Thus, this beneficial effect of silicon plus the beneficial effect of a minimum 4.5% molybdenum addition combine to inhibit excessive surface oxide formation and spalling in the presence of detrimental chloride salts which act to break down protective oxide layers.

TABLE 1

CHEMICAL COMPOSITION OF LABORATORY HEATS — STRIP ANALYSIS

| Heat No. | C | Mn | Fe | S | Si | Cu | Ni | Cr | Al | Ti | Mo | Nb | N |
|---|---|---|---|---|---|---|---|---|---|---|---|---|---|
| A | .024 | .41 | 37.18 | <.01 | .36 | .20 | 34.97 | 21.14 | .10 | .32 | 4.62 | .41 | .024 |
| B | .023 | .39 | 40.21 | .001 | 1.42 | .21 | 30.87 | 21.23 | .08 | .36 | 4.77 | .38 | .003 |
| C | .021 | .37 | 37.52 | .002 | .11 | .19 | 35.08 | 21.54 | .05 | .33 | 4.38 | .36 | .002 |
| D | .028 | .39 | 37.54 | .001 | .21 | .20 | 34.92 | 21.19 | .10 | .36 | 4.64 | .38 | .002 |
| E | .027 | .40 | 36.88 | .001 | .80 | .20 | 34.96 | 21.16 | .13 | .37 | 4.66 | .38 | .003 |

TABLE 2

Depth of Attack and Weight Change Measurements
Hot Salt Test Series 18 — 1400° F. (760° C.),
15-5 Cycle, 7.5% NaCl + 2.5% CaCl$_2$
(Results are the average of duplicate specimens)

| | | Wt. Change (gr) at Cycles Indicated | | | | Depth of Attack (mils) after 1401 |
|---|---|---|---|---|---|---|
| Heat No. | % Si | 346 | 750 | 1197 | 1401 | Cycles |
| A | 0.36 | +0.126 | +.394 | −0.496 | −0.920 | 12.0 |
| B | 1.42 | +0.059 | +0.034 | 0.030 | −0.101 | 6.5 |
| C | 0.11 | +0.069 | −1.725 | −4.399 | −5.820 | 18.0 |
| D | 0.21 | +0.111 | −0.816 | −1.628 | −2.238 | 17.0 |
| E | 0.80 | +0.097 | +0.115 | +0.129 | +0.073 | 8.0 |

TABLE 3

Total Oxide Thickness (including internal oxide)
1400° F. (760° C.), 1401 (15-5 Cycles,
7.5% NaCl + 2.5% CaCl, Dip Daily, Annealed

| Heat No./Code No. | Depth of Oxidation | | Si |
|---|---|---|---|
| | Side 1 inches (mm) | Side 2 inches (mm) | |
| C/90 | 0.0102 (0.26) | 0.0179 (0.45) | 0.11 |
| C/91 | 0.0112 (0.28) | 0.0173 (0.44) | |
| D/92 | 0.0110 (0.28) | 0.0129 (0.33) | 0.21 |
| D/93 | 0.0161 (0.41) | 0.0041 (0.1) | |
| E/94 | 0.0041 (0.1) | 0.0031 (0.08) | 0.80 |
| E/94 | 0.0055 (0.14) | 0.0040 (0.1) | |
| A/96 | 0.0093 (0.24) | 0.0101 (0.26) | 0.36 |
| A/97 | 0.0167 (0.42) | 0.0032 (0.08) | |
| B/98 | 0.0055 (0.14) | 0.0043 (0.11) | 1.4 |
| B/99 | 0.0039 (0.1) | 0.0046 (0.12) | |

[1]—Continuous thin film coating, 10–25 microns in thickness.

Unexpectedly, it appears that increasing silicon in a modified hiscor alloy (U.S. Pat. No. 4,784,831) to about 1.5% produces a 60% decrease in the overall depth of attack during hot salt exposure at 1400° F. (760° C.). Severe weight change (loss) due to oxide spallation is stopped and a stable oxide layer produced by a silicon addition of 0.8% or more. The total oxide thickness (including internal oxide) was also reduced when the silicon level was increased.

Preliminary 1000° F. (538° C.) fatigue tests of the instant alloys were conducted at about 50 Ksi (345 MPa) to 80 Ksi (552 MPa). Failures occurred at about 70 Ksi (483 MPa) which suggests this to be the fatigue limit. Stainless steel 321 has a fatigue limit of about 50 Ksi (345 MPa) whereas alloy 625LCF fails at about 95 Ksi (655 MPa). Thus the fatigue properties favorably fall between the stainless steel and the 625LCF alloy.

In order to ensure adequate ductility, a final annealing step at about 1900° F. (1038° C.) for about three minutes may be undertaken. This results in a maximum ASTM grain size number of 8–9 and about 40% elongation.

Figure 6:
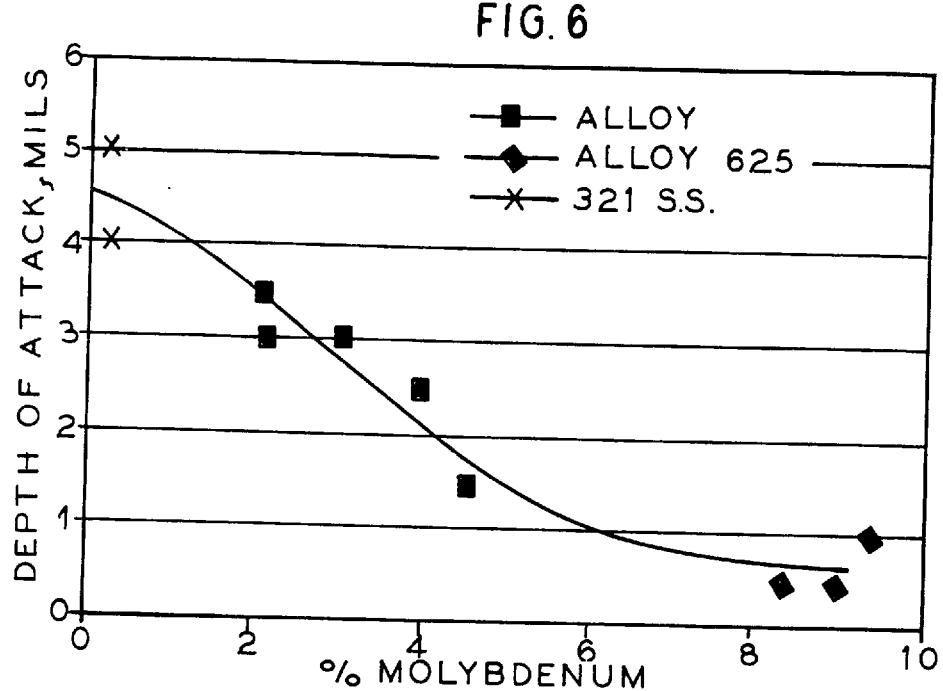
FIGS. 6, 7 and 8 are graphs showing the effect of varying molybdenum levels on the invention.
Figure 7:
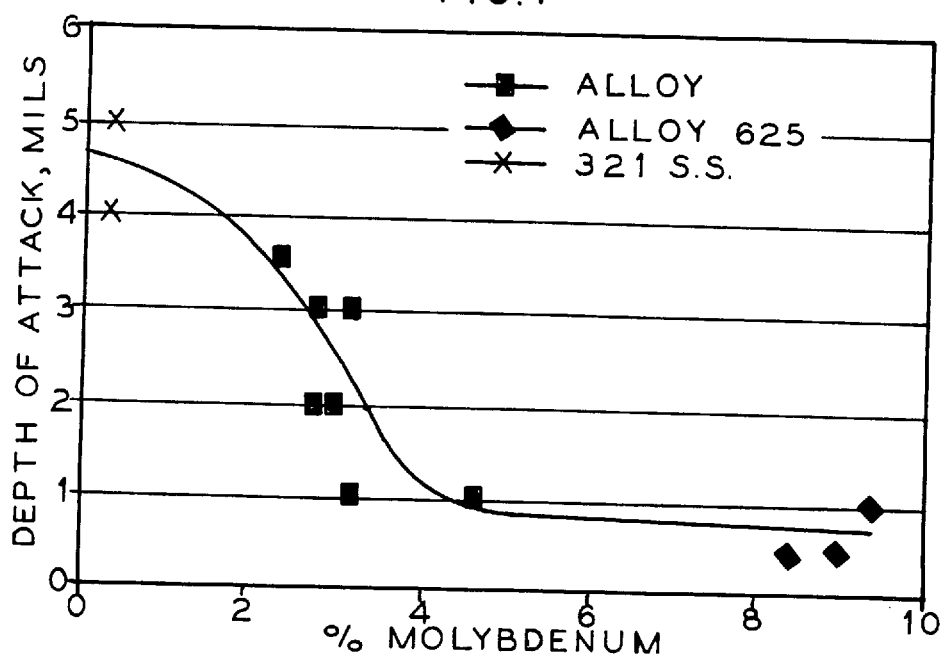
Figure 8:
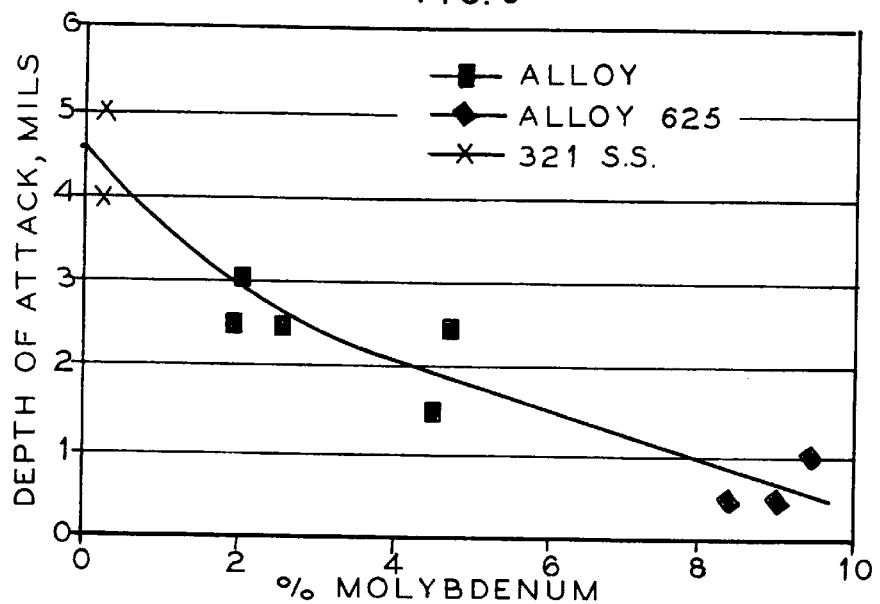

To determine the effect of molybdenum on the instant alloy a series of heats were prepared. FIGS. 6, 7, and 8 show an average of U-bend and straight specimen depth of attack (in mils) hot salt corrosion values for three base compositions. FIG. 6 is for a 30% nickel—21% chromium base alloy. FIG. 7 is for a 35% nickel—21% chromium base alloy. And FIG. 8 is for a 42% nickel—21% chromium base alloy. For completeness, the base alloy also includes about 0.1–0.68% titanium, 0.2% carbon, 0.45% magnesium, less than 0.01% sulfur, 0.35% silicon, 0.2% carbon, 0.15% aluminum, and the balance iron.

Sample values for alloy 625 and 321 stainless steel are shown for comparison purposes. Note that as the molybdenum content increases for the base alloys, the depth of attack decreases evidencing the beneficial effect of molybdenum. Higher levels of molybdenum, that is, levels in excess of about 6% would add to the cost of the product and decrease the stability of the alloy at operating temperature.

These curves demonstrate that one of the objectives of the instant invention has been met. The hot salt corrosion values fall midway between alloy 625 and 321 stainless steel.

Figure 9:
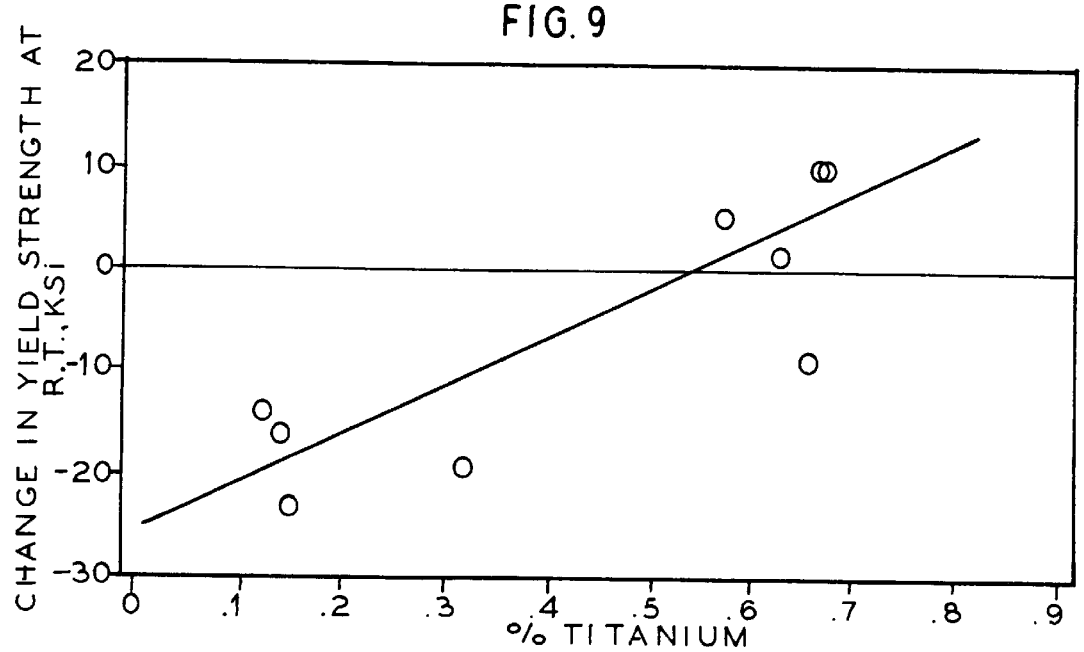
FIG. 9 demonstrates the effect of titanium on the mechanical properties of the invention.

Titanium serves to improve the mechanical properties of the instant invention. FIG. 9 demonstrates the effect of titanium on yield strength after aging on a series of alloys within the claimed ranges. The change in yield strength at room temperature in ksi is shown for the following thermomechanical operation: The alloys are cold rolled 30% and tested in the cold rolled and cold rolled plus aging at 1150° F. (621° C.) for 300 hours. Table 4 lists a selected number of alloys and their room temperature yield strength results. These values are plotted on FIG. 9. Both alloy 625 and 321 stainless are shown for comparison purposes in the table only.

TABLE 4

Room Temperature Yield Strength Test Results

| Heat No. | Composition | Yield Strength Change[1] |
|---|---|---|
| A | 35Ni-4.6Mo-.3Ti-.4Nb | −19 |
| F | 30Ni-2.0Mo-.6Ti-.7Nb | +5 |
| G | 30Ni-4.6Mo-.6Ti-.1Nb | +1 |
| H | 30Ni-4.0Mo-.2Ti-.7Nb | −23 |
| I | 35Ni-2.8Mo-.7Ti-.1Nb | +10 |
| J | 35Ni-3.2Mo-.1Ti-.7Nb | −14 |
| K | 42Ni-2.1Mo-.7Ti-.1Nb | −9 |
| L | 42Ni-2.0Mo-.1Ti-.7Nb | −16 |
| M | 42Ni-4.8Mo-.7Ti-.8Nb | +10 |
| | alloy 625, lab | +19 |
| | 321 S.S. (commercial) | −33 |

[1]Change in Yield Strength = (Yield Strength CR 30% + 1150° F.(621° C.)/300 hr.) - (Yield Strength CR 30%)

Bellows are formed by cold working. They are placed into service where they are exposed to exhaust line temperatures ranging from about 800°–1400° F. (427°–760° C.). As shown in FIG. 9 cold worked materials may either lose strength or gain strength during aging (which is analogous to service) exposure depending on titanium content. Thus the properties actually improved during service conditions.

At above about 0.55% titanium, the strength and ductility increases apparently due to an aging mechanism. Increasing titanium significantly above about 1.0% would be expected to cause excessive aging with essential loss of ductility.

Alloy 625 also shows improvement while 321 stainless steel improves in ductility but appreciably loses strength after aging. Again, the instant invention is superior to 321 stainless steel.

Comparisons of the elongation measured for 1750° F. (954° C.) plus 30% cold working and 1750° F. (954° C.) plus 30% cold working plus 1150° F. (621° C.) aging show that aging actually increases the ductility of titanium regardless of titanium level.

What this demonstrates is that with the titanium imparting strength and the aging process imparting ductility, a bellows constructed from the instant alloy at about 0.55%–1.0% titanium would have the unusual characteristic of becoming both stronger and more ductile during service conditions.

A flexible coupling, bellows, wire and other components made from the instant alloy can be expected to have the following ingredients and characteristics:

a) a minimum of about 0.8% silicon;

b) a minimum of about 0.55% titanium;

c) about 40 ksi (275 MPa) yield strength and about 40% elongation at room temperature;

d) fatigue properties of about 10,000 cycles at 70 ksi (483 MPa);

e) a grain size of about ASTM 8–9;

f) hot salt corrosion resistance greater than 321 stainless steel;

g) satisfactory chloride stress corrosion cracking and pitting resistance;

h) stability at the requisite operating temperature of about 820°–1400° F. (427°–760° C.); and i) the desirable property of increasing strength and ductility during service.

While in accordance with the provisions of the statute, there is illustrated and described herein specific embodiments of the invention. Those skilled in the art will understand that changes may be made in the form of the invention covered by the claims and the certain features of the invention may sometimes be used to advantage without a corresponding use of the other features.

The embodiments of the invention that an exclusive property or privilege is claimed are defined as follows:

1. A flexible, thermally stable and weldable nickel-base alloy demonstrating a) fatigue resistance, b) hot salt corrosion resistance, c) chloride stress corrosion cracking resistance, d) pitting and general corrosion resistance generally superior to 321 and 316Ti stainless steels, and e) increasing strength and ductility during service conditions of about 800° F.–1400° F. (427° C.–760° C.), the alloy consisting essentially of 35.5–42% nickel, 21–28% chromium, 4.6–6% molybdenum, 0.8–1.5% silicon, 0.3–1% titanium, up to 0.25% copper, up to 0.45% niobium, up to 0.3% carbon, up to 0.5% manganese, up to 1% aluminum, up to 0.3% nitrogen, up to 0.001% sulfur, trace commercial impurities, a maximum ASTM grain size number of 8–9, a room temperature yield strength of about 40 ksi (275 mPa), and the balance iron.

2. The alloy according to claim 1 including 35.5% nickel, 21% chromium, 4.6% molybdenum, at least 1–1.5% silicon, and the balance iron.

3. The alloy according to claim 1 including about 1.1–1.42% silicon.

4. A component selected from the group consisting of bellows, wire, broad and heater sheath consisting essentially of the alloy claimed in claim 1.

* * * * *